United States Patent
Hedegard

(10) Patent No.: US 6,202,149 B1
(45) Date of Patent: Mar. 13, 2001

(54) AUTOMATED APPLICATION FAIL-OVER FOR COORDINATING APPLICATIONS WITH DBMS AVAILABILITY

(75) Inventor: Lynn Poul Hedegard, Encinitas, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/164,258

(22) Filed: Sep. 30, 1998

(51) Int. Cl.$^7$ .................................................. G06F 9/445
(52) U.S. Cl. .............................. 713/100; 709/221; 714/7; 714/47
(58) Field of Search .................................. 713/1, 2, 100, 713/201; 707/100–104, 200–206; 395/112.04; 714/4, 6, 7, 39, 47; 709/223, 220, 221, 222; 710/8, 10; 712/15

(56) References Cited

U.S. PATENT DOCUMENTS

| | | | |
|---|---|---|---|
| 4,432,057 | * | 2/1984 | Daniell et al. .................. 364/300 |
| 4,817,094 | * | 3/1989 | Lebizay et al. .................. 371/36 |
| 5,023,873 | | 6/1991 | Stevenson et al. . |
| 5,210,854 | | 5/1993 | Beaverton et al. . |
| 5,359,730 | | 10/1994 | Marron . |
| 5,410,684 | | 4/1995 | Ainsworth et al. . |
| 5,414,837 | | 5/1995 | Kotatsu . |
| 5,448,727 | | 9/1995 | Annevelink . |
| 5,613,060 | | 3/1997 | Britton et al. . |
| 5,678,042 | | 10/1997 | Pisello et al. . |
| 5,758,052 | * | 5/1998 | Glowny et al. ............. 714/4 |
| 5,790,674 | * | 8/1998 | Houvener et al. ............. 380/23 |
| 5,815,649 | * | 9/1998 | Utter et al. ............. 395/112.04 |
| 5,829,053 | * | 10/1998 | Smith et al. ............. 711/202 |
| 5,832,225 | * | 11/1998 | Hacherl et al. ............. 709/223 |
| 5,845,255 | | 12/1998 | Mayaud . |
| 5,896,370 | * | 4/1999 | Eckhoff et al. ............. 370/228 |
| 5,905,860 | * | 5/1999 | Olsen et al. ............. 713/201 |
| 5,909,540 | | 6/1999 | Carter et al. . |
| 5,960,426 | | 9/1999 | Pirahesh et al. . |
| 5,987,516 | | 11/1999 | Rao et al. . |
| 5,995,980 | | 11/1999 | Olson et al. . |

* cited by examiner

Primary Examiner—Thomas C. Lee
Assistant Examiner—Rijue Mai
(74) Attorney, Agent, or Firm—Gates & Cooper

(57) ABSTRACT

A method and apparatus for automatically redistributing tasks to reduce the effect of a computer outage on a computer network. The apparatus comprises at least one redundancy group comprised of one or more computing systems, comprised of one or more computing system partitions. The computing system partition includes copies of a database schema that are replicated at each computing system partition. The redundancy group monitors the status of the computing systems and the computing system partitions, and assigns a task to the computing systems based on the monitored status of the computing systems.

16 Claims, 11 Drawing Sheets

AUTOMATED APPLICATION FAIL-OVER FOR COORDINATING APPLICATIONS WITH DBMS AVAILABILITY

CROSS REFERENCE TO RELATED APPLICATIONS

This application is related to co-pending and commonly assigned U.S. patent application Ser. No. 09/163,708 filed on same date herewith, by Irving M. Robinson, et al., entitled "Provision Of Continuous Database Service And Scalable Query Performance Using Active Redundant Copies," which application is incorporated by reference herein.

BACKGROUND OF THE INVENTION

1. Field of the Invention

The invention relates in general to computer systems, and more particularly, to an automated application fail-over for coordinating applications with database management system (DBMS) availability.

2. Description of Related Art

Many modern computer systems are in nearly continuous use, and have very little time to be taken "down" or "offline" for database updates or preventative maintenance. Further, computer systems increasingly require systems that virtually never fail and have little or no scheduled downtime. As a concurrent requirement, these same systems demand cost-effective computing solutions, open systems to avoid or reduce specific supplier dependencies, and the ability to leverage the latest hardware and software technologies as they become available.

Modern computer systems also have transitioned from a static installation to a dynamic system that regularly changes. The system continually contains new collections of products and applications that are processing requests from a constantly changing user base. The ability of computing solutions to provide service availability in a dynamic environment is becoming increasingly important, because the pace of change in products and customers' environments is expected to increase. The term "change tolerance" has been used to describe the ability of a computing system to adapt to the dynamic environment required.

It can be seen, then, that there is a need in the art for a system that provides a high confidence level for continuous processing. It can also be seen, then, that there is a need in the art for a system with a high change tolerance. It can also be seen, then, that there is a need in the art for a system with reasonable development costs and implementation schedules that does not sacrifice the benefits of open systems.

SUMMARY OF THE INVENTION

To overcome the limitations in the prior art described above, and to overcome other limitations that will become apparent upon reading and understanding the present specification, the present invention discloses a method and apparatus for automatically reconfiguring a computer network when a triggering event occurs.

The apparatus comprises at least one redundancy group comprised of one or more computing systems, comprised of one or more computing system partitions. The computing system partition includes copies of a database schema that are replicated at each computing system partition. The redundancy group monitors the status of the computing systems and the computing system partitions, and assigns a task to the computing systems based on the monitored status of the computing systems.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a method, apparatus, and article of manufacture for distributing computer resources in a network environment to avoid the effects of a failed computing system.

The apparatus comprises at least one redundancy group comprised of one or more computing systems, comprised of one or more computing system partitions. The computing system partition includes copies of a database schema that are replicated at each computing system partition. The redundancy group monitors the status of the computing systems and the computing system partitions, and assigns a task to the computing systems based on the monitored status of the computing systems.

Reassignment of a task can occur upon hardware or software problems with the first assignee, or to allow the first assignee to be taken out of service for maintenance purposes. This control is provided by a combination of software systems operating on each of the networked computing systems, and can also be provided on external computing systems called Control Computers. The software on the networked computing system and control computer together determine the status of each of the networked computing systems to determine when to reassign the recipient computing system, and if so, which of the networked computing systems should receive the database updates. The determination is achieved by using periodic messages, time-out values, and retry counts between the software on the networked computing systems and the control computers.

Hardware Environment

Figure 1:
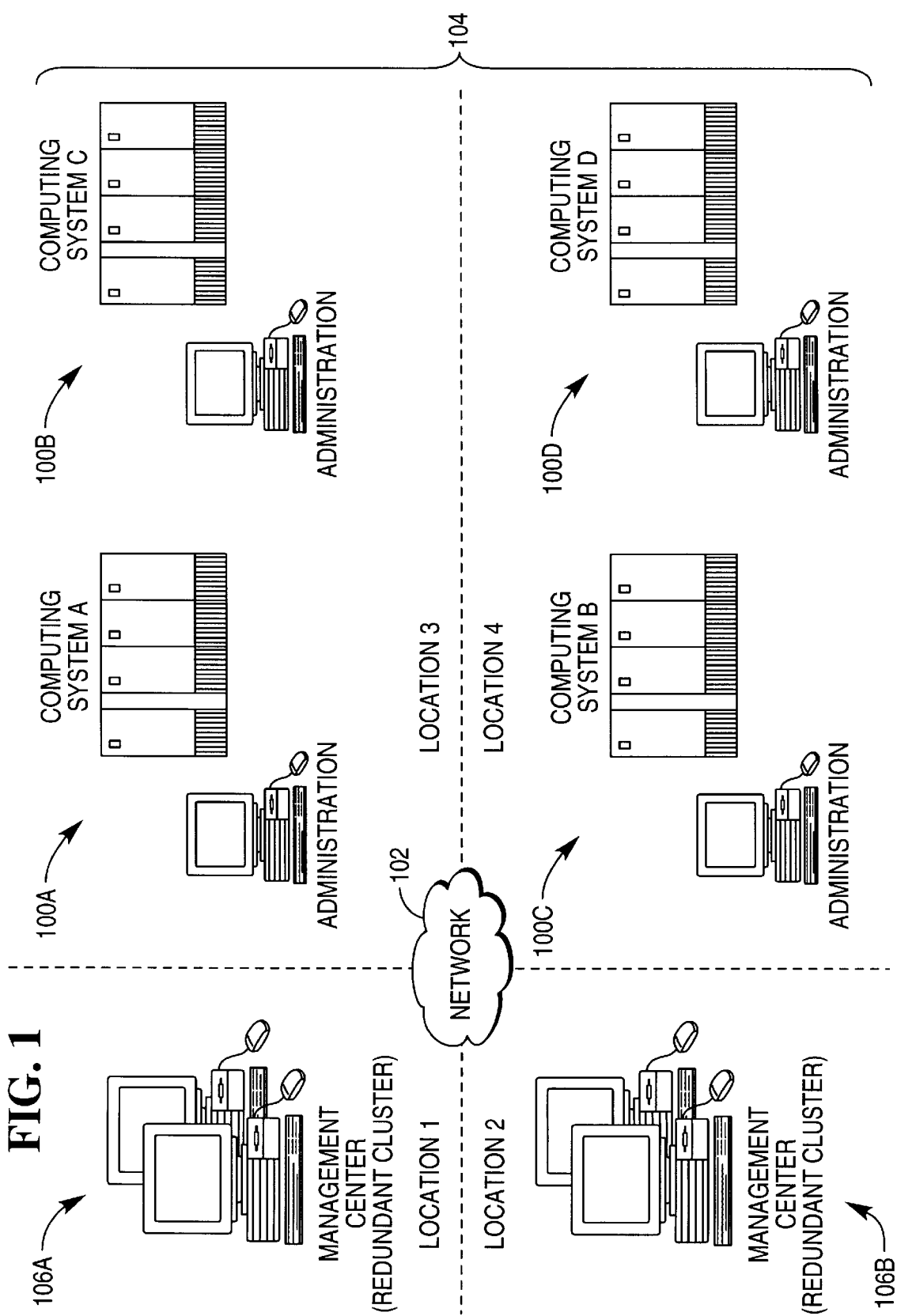
FIG. 1 is a block diagram that illustrates an exemplary hardware environment that could be used with the present invention.

FIG. 1 is an exemplary hardware environment used to implement the preferred embodiment of the invention. The present invention is typically implemented using a plurality of computing systems 100A–100D, each of which generally includes, inter alia, a processor, random access memory (RAM), data storage devices (e.g., hard, floppy, and/or CD-ROM disk drives, etc.), data communications devices (e.g., modems, network interfaces, etc.), etc.

The computing systems 100A–100D are coupled together via network 102 and comprise a redundancy group 104. Each computing system 100A–D further comprises one or more computing system partitions (not shown), which are described in further detail in FIGS. 2–4. In addition, management centers 106A and 106B can be coupled to network 102. Management centers 106A and 106B are representative only; there can be a greater or lesser number of management centers 106 in the network 102. Further, there can be a greater or lesser number of computing systems 100A–100D connected to the network 102, as well as a greater or lesser number of computing systems 100A–D within the redundancy group 104.

The present invention also teaches that any combination of the above components, or any number of different components, including computer programs, peripherals, and other devices, may be used to implement the present invention, so long as similar functions are performed thereby. The presentation of the computing system as described in FIG. 1 is not meant to limit the scope of the present invention, but to illustrate one possible embodiment of the present invention.

Relationships and Operation

Figure 2:
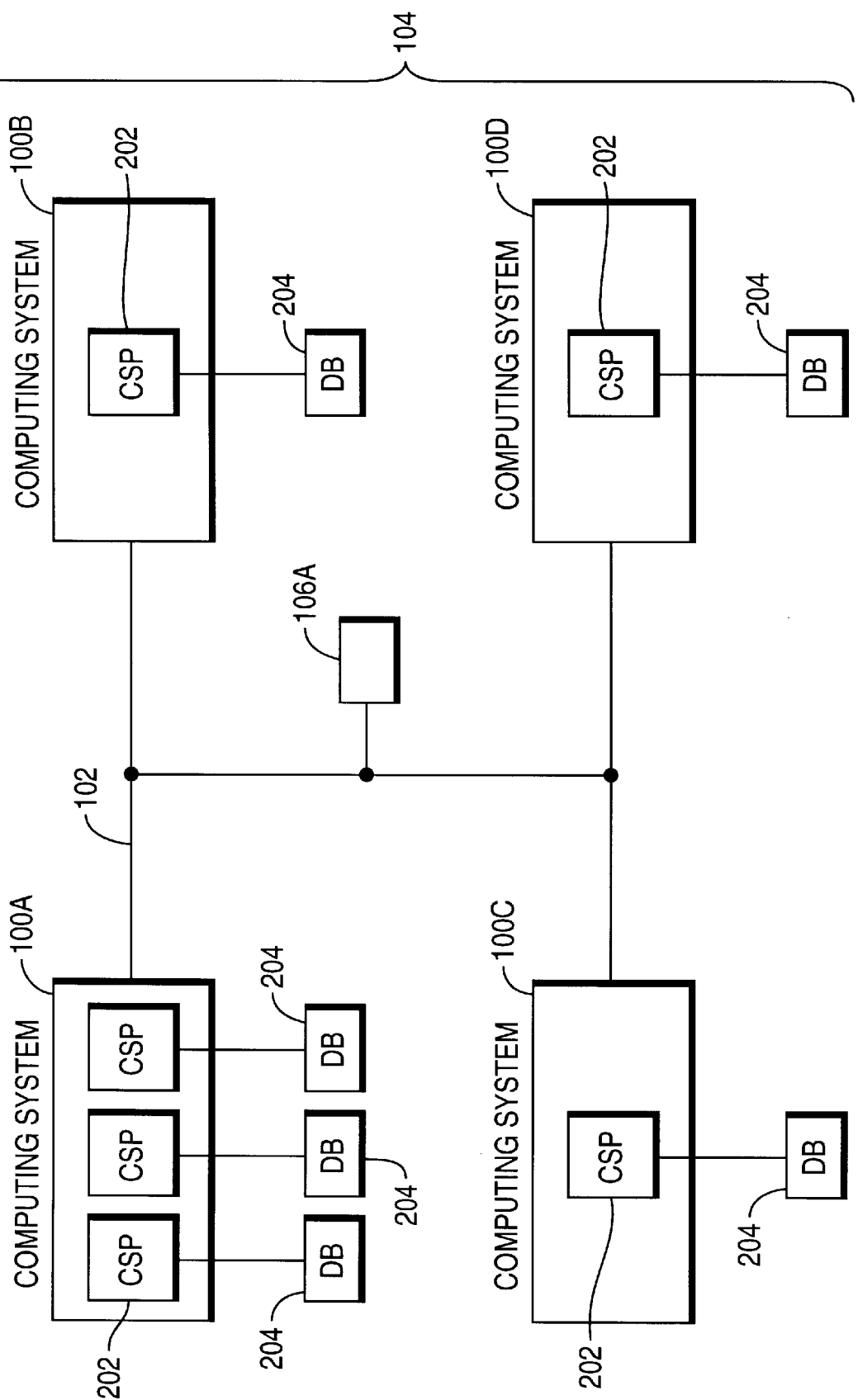
FIG. 2 further illustrates the components within a computing system of the present invention.

FIG. 2 further illustrates the components within the computing systems 100A–D of the present invention. Within the computing systems 100A–D are one or more computing system partitions (CSPs) 202. Each CSP 202 is coupled to only one copy of a database 204. The computing systems 100A–D are coupled together via network 102.

Management center computer 106A (or, alternatively, 106B) can be used to control the flow of data from the database copies 204 and updates to the computing systems 100A–100D. The database 204 can also be controlled directly from computing systems 100A–D if desired.

Each copy of the database 204 is associated with a computing system partition CSP) 202. As shown in FIG. 2, each computing system 100A–D can have one or more CSP's 202 resident within a computing system, as illustrated in computing system 100A.

A redundancy group 104 is a collection of CSPs 202 collaborating in an actively redundant fashion on a specific workload using a single replicated database 204 schema. The CSPs 202 may be resident on a single node computing system 100B, C, D, a multi-node computing system 100A, or on selected subsets of computing nodes from one or more multi-node computing systems 100A. Each CSP 202 has an independent database copy of the database 204 for the redundancy group 104. The definition for a CSP 202 is that set of computing resources using a single copy of the replicated database 204.

The fundamental component of a CSP 202 is a single computing node executing an independent copy of an operating system. However, CSP 202 may consist of multiple nodes and, therefore, multiple operating system instances. The operating system operating on each CSP 202 can be different, e.g., one CSP 202 may be using Windows, while another CSP 202 uses Unix, etc. An operating system instance may be a participant in one and only one redundancy group 104, meaning that the computing nodes comprising a CSP 202 are "owned" by that redundancy group 104. A multi-node computing system 100A can have different nodes participating in different redundancy groups 104, but there must be no overlap between redundancy groups 104.

To synchronize and replicate the database 204 between the computing systems 100A–100D, one of the computing systems 100A–D is responsible for receiving direct updates of the database 204 via network 102 and disseminating or replicating those updates of database 204 to the remaining computing systems 100A–D.

As an example, computing system 100B can be designated as the recipient of the direct updates to database 204. Once the updates are received by computing system 100B, computing system 100B then sends a copy of the database 204 with updates to computing systems 100A, 100C, and 100D via network 102. This process continues until computing system 100B has sent a copy of database with updates to all computing systems 100A, C, and D within the network 102.

If computing system 100B is unavailable, the responsibility of replicating the database and updates shifts to another computing system 100A–D in the network 102. As an example, if computing system 100B is unavailable, the database replication responsibility shifts to computing system 100C, which then receives direct updates. Computing system 100C then replicates the database and updates to computing systems 100A and 100D. Computing system 100C continues the replication until all computing systems 100A and 100D in the network 102 receive copies of the database and updates.

Redundancy Strategy

Figure 3:
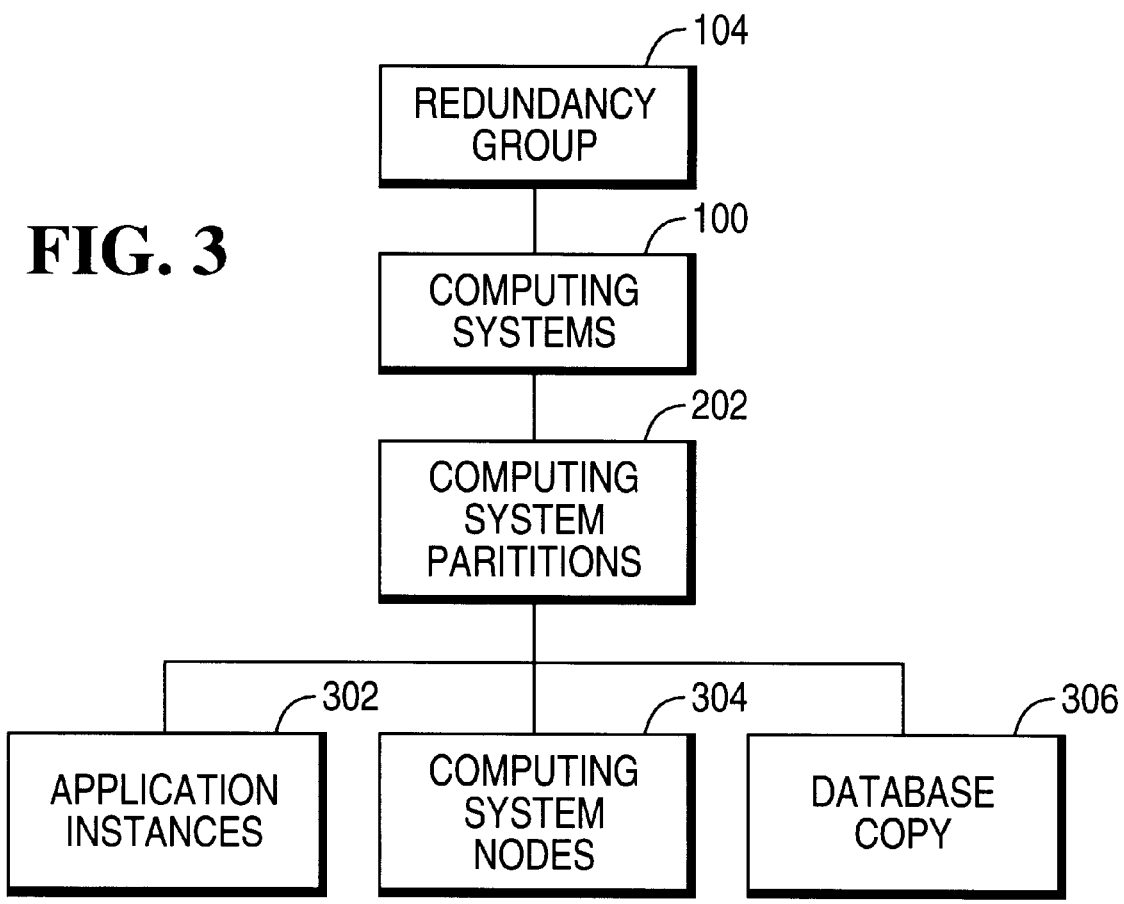
FIG. 3 illustrates the redundancy strategy of the present invention.

FIG. 3 illustrates the hierarchical redundancy strategy of the present invention. To effectively perform the replication of the database 204 and the updates as described in FIG. 2, the present invention partitions the network 102 into redundancy groups 104. Each redundancy group 104 is comprised of computing systems 100A–D, computing system partitions 202, application instances 302, computing system nodes 304, and database copy 306.

Typical networks 102 have multiple redundancy groups 104. The relationship between redundancy groups 104 is somewhat limited, but all redundancy groups 104 can participate in a global network 102, and a global administration view is typically used for such a network 102. In general, however, redundancy groups 104 are envisioned to be mostly independent of each other and constructed for the purposes of application-level independence, administrative flexibility, or the ability to use computing systems 100A–D of modest capabilities.

The redundancy group 104 is the fundamental factor of service availability and scalable query performance. The present invention uses the redundancy group 104 to reduce or eliminate a service outage so long as at least one CSP 202 in the redundancy group 104 is fully operational. The present invention also uses the redundancy group 104 to scale query performance beyond that attainable with just one computing system partition 202 and one copy of the database 306. Query performance and availability scale as CSP's 202 are added to a redundancy group 104. With standard computing systems 100A–D, as performance goes up, availability typically goes down. The present invention allows both availability and query performance for computing systems 100A–D to both go up simultaneously.

Redundancy groups 104 of the present invention accommodate the condition in which CSPs 202 arbitrarily undergo exit and reintroduction scenarios, but a sufficiently configured redundancy group 104 does not cease proper functionality. The limits of redundancy group 104 functionality and database 204 access is limited by scenarios outside of the control of the computing system 100A–D, e.g., unplanned hardware or software malfunctions, etc.

Computer Architecture Model

Figure 4:
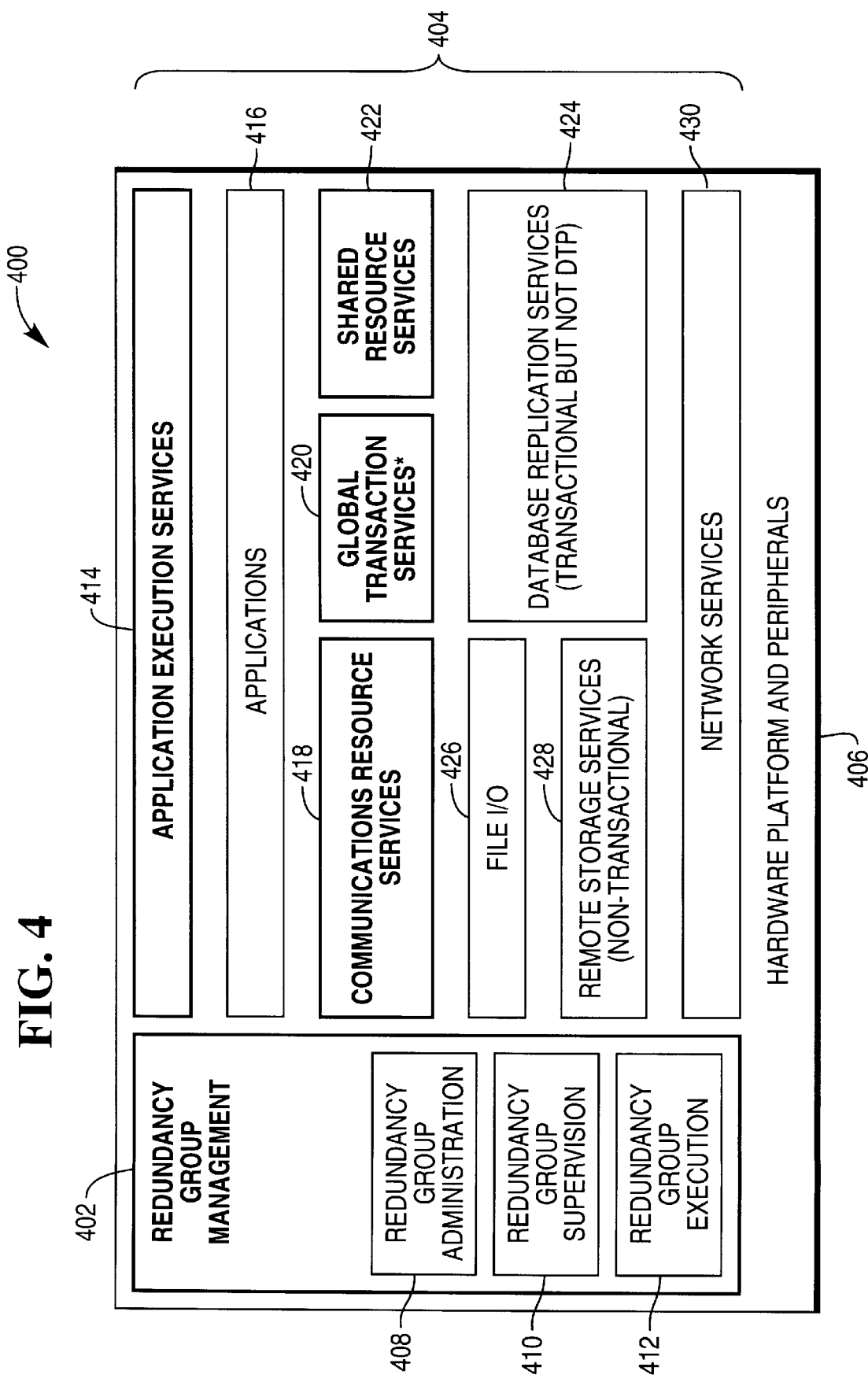
FIG. 4 illustrates a model of the computer architecture of the present invention.

FIG. 4 illustrates a model of the computer architecture of a computing system partition 202 of the present invention. The architecture model 400 has three significant environments: the management environment 402, the run-time environment 404, and the hardware environment 406. The management environment 402 is illustrated as redundancy group management 402. The run-time environment 404 comprises the software components that provide application services directly or indirectly, which is the majority of the components in the model 400. The hardware environment 406 is depicted as the hardware platform, e.g., computer network 102, and peripherals.

Redundancy group management 402 comprises of the tools, utilities and services necessary to administer, supervise and provide executive control over elements of a redundancy group 104. The components within the redundancy group management 402 environment include redundancy group administration 408, redundancy group supervision 410, redundancy group execution 412.

The redundancy group administration 408 component provides tools for definition, configuration, and operations of a redundancy group 104. These tools communicate with other tools that provide administrative control of product specific components. Operations include facilities to startup, shutdown, install and/or upgrade elements of redundancy groups 104. Included in the upgrade and install categories are special facilities necessary for verification. Included in the definition and configuration capabilities are defining policies and procedures to be used by both humans and machines. Additionally, it is foreseen that advanced utilities to determine the scope of failures and subsequently identify recovery procedures would be in this component.

The redundancy group supervision 410 component provides those services that monitor the health of a redundancy group 104. Included are the services for status request handling, heartbeat setup and monitoring, and failure detection.

The redundancy group execution 412 component provides those executive services that manage and control the workload of a redundancy group. Included are those services that provide transaction and request-level load balancing and reconfiguration. This component manages and controls the workload of normal transactions as well as recovery requests.

Run-time Environment

The run-time environment 404 comprises the services necessary to support application programs within redundancy groups 104. The components of the run-time environment 404 include application execution services 414, applications 416, communications resource services 418, global transaction services 420, shared resource services 422, database replication services 424, file i/o 426, remote storage services 428, and network services 430. These components fall into two categories, 1) those components typically utilized by applications 416 directly, and 2) those components typically utilized by applications 416 indirectly. Services that fall into the second category are used by those services in the first category.

Application execution services 414 provide pre- and post-processing on behalf of an application 416. Such services include application 416 instantiation, parameter marshaling, and queue access services. Application execution services 414 also inform the application 416 of the status of a given transaction request and its disposition; for example, whether it is a normal transaction request, a recovery request, or whether the request is a request to startup or shutdown the application 416. Application execution services 414 also include services necessary to communicate to redundancy group management 402 components. Additionally, application execution services 414 handle application 416 error situations.

Applications 416 are services to the consumers of a system (network 102), and are composed of software components. Applications 416 are reduced in complexity by leveraging other services in a rich operating environment, such as application 416 execution services 414 and shared resource services 422, since these other services supply needed levels of transparency.

The communication resource services 418 component comprises services that provide application 416-to-application 416 communications within redundancy groups 104.

The global transaction services 420 component provides services to maintain transaction context and to coordinate transaction integrity procedures and protocols. These services include facilities for an application 416 to query the global transaction status, and commit or abort transactions.

The shared resource services 422 component is a general container for services that provide access to shared resources. In a redundancy group 104 the shared resources of interest are replicated databases 204, and, therefore, database 204 access services reside in the shared resource services 422 component. Database 204 access services include services that provide the capability to create, read, write, rewrite, and delete data within a replicated database 204.

Database replication services 424 fall into the indirect class of application 416 services. The database replication services 424 propagate database 204 updates transparently to all copies of the database 204 in a redundancy group 104. There are primarily two database 204 replication models, as described in the discussion relating to FIG. 5.

File i/o services 426 are not utilized directly by customer applications 416, but are provided for use by system software components requiring non-transactional, persistent data storage and access services. File i/o is typically used for logging or journaling functions, event capture, software executables, and data interchange files.

Remote storage services 428 allow a given file update request to be processed at locations remote from the location of the file i/o request, enabling file replication. System components that take advantage of these services are those that require non-transactional access to queues, logs and system files that would be inappropriate for storage in an database.

Network services 430 include those services that provide high performance, highly reliable transport of messages. Of specific interest are those services that provide multi-casting of messages which results in an optimal and guaranteed delivery of messages to all destinations in a specified domain of receivers, e.g., computing systems 100A–D. This component also benefits applications indirectly, e.g., customer applications 416 would not call the interface that initiates these services. Rather, these services would be provided to the application 416 through communications resource services 418.

Network platform 406 is the computing hardware, e.g., network 102, that is used for executing the instructions associated with the application 416, etc.

Database Replication Schemes

Figure 5:
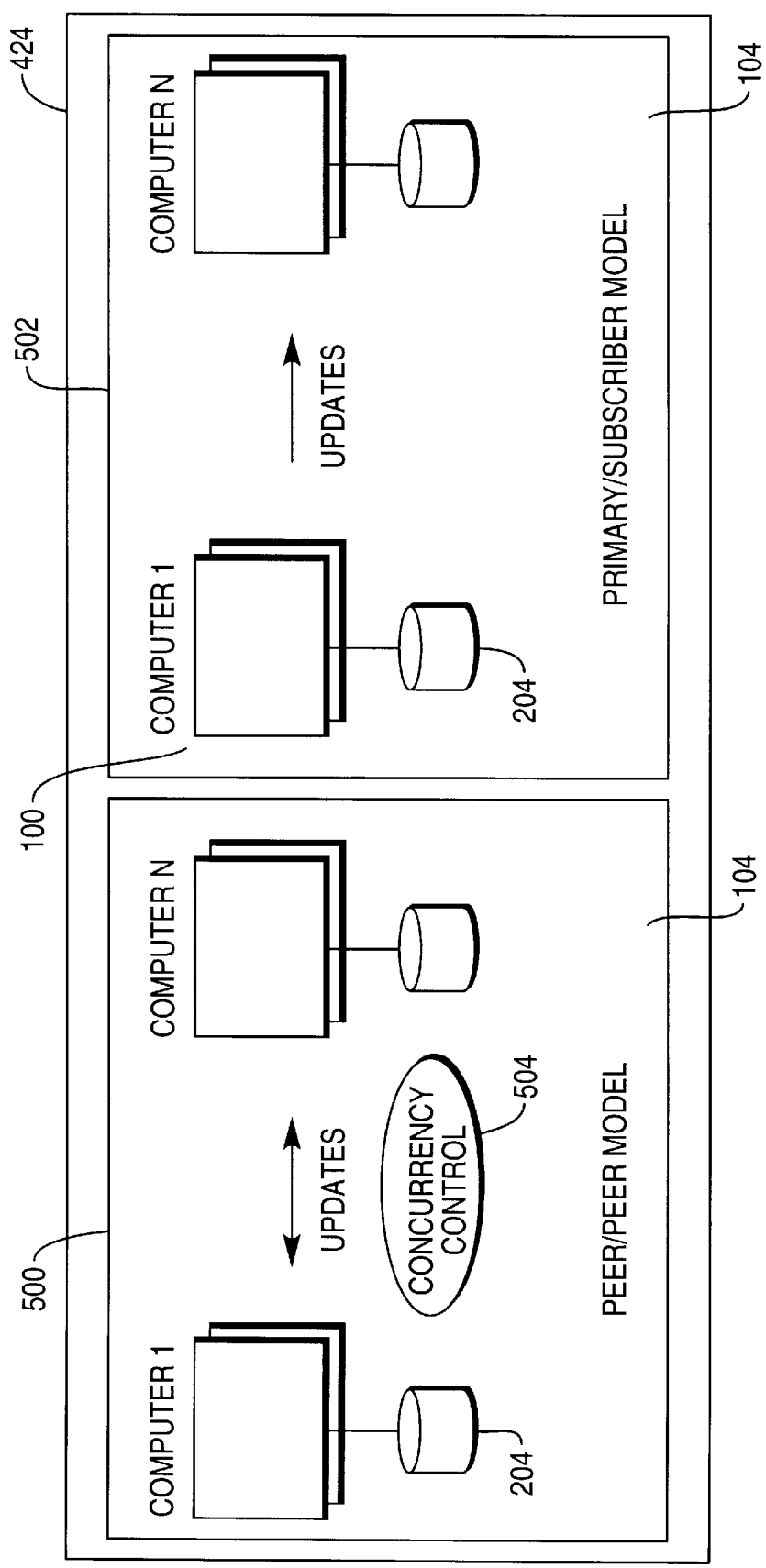
FIG. 5 illustrates replication of the database using the present invention.

FIG. 5 illustrates replication of the database using the present invention. Within network 424, replication schemes 500 and 502 can be utilized to replicate database 204. Either replication scheme 500 or replication scheme 502, or both, can be used within network 424, depending on the architecture of the redundancy groups 104.

Database 204 replication is the synchronization mechanism between the database 204 copies in a redundancy group 104. The present invention could also utilize transaction-level replication (reprocessing the entire application transaction on each participating system) instead of entire database 204 replication, but the discussion relating to database 204 replication applies equally well to transaction-level replication. References herein relating to database 204 replication include transaction-level replication.

At least two distinct database 204 replication models are supported by the present invention, peer/peer replication model 500 and primary/subscriber replication model 502. Other database replication models are envisioned, but the discussion herein is limited to the two models 500 and 502. The peer/peer replication model 502 update transactions are processed on any logical system in a redundancy group 104. Inter-copy database 204 consistency and serializability are maintained either through global network 102 concurrency controls 504, or through commit certifications that occur within the redundancy group 104.

In the primary/subscriber replication model 502, all update transactions are routed to a single logical system, e.g., computing system 100A, in the redundancy group 104, called the primary system, which propagates updates to the other logical systems, e.g., computing systems 100B–D, after the commitment of a transaction is complete. The update transaction routing is performed transparently and automatically. When the primary logical system, e.g., computing system 100A, exits the redundancy group 104 (for reasons of failure or scheduled downtime) a new primary system is selected. See the discussion relating to FIG. 2.

Figure 6:
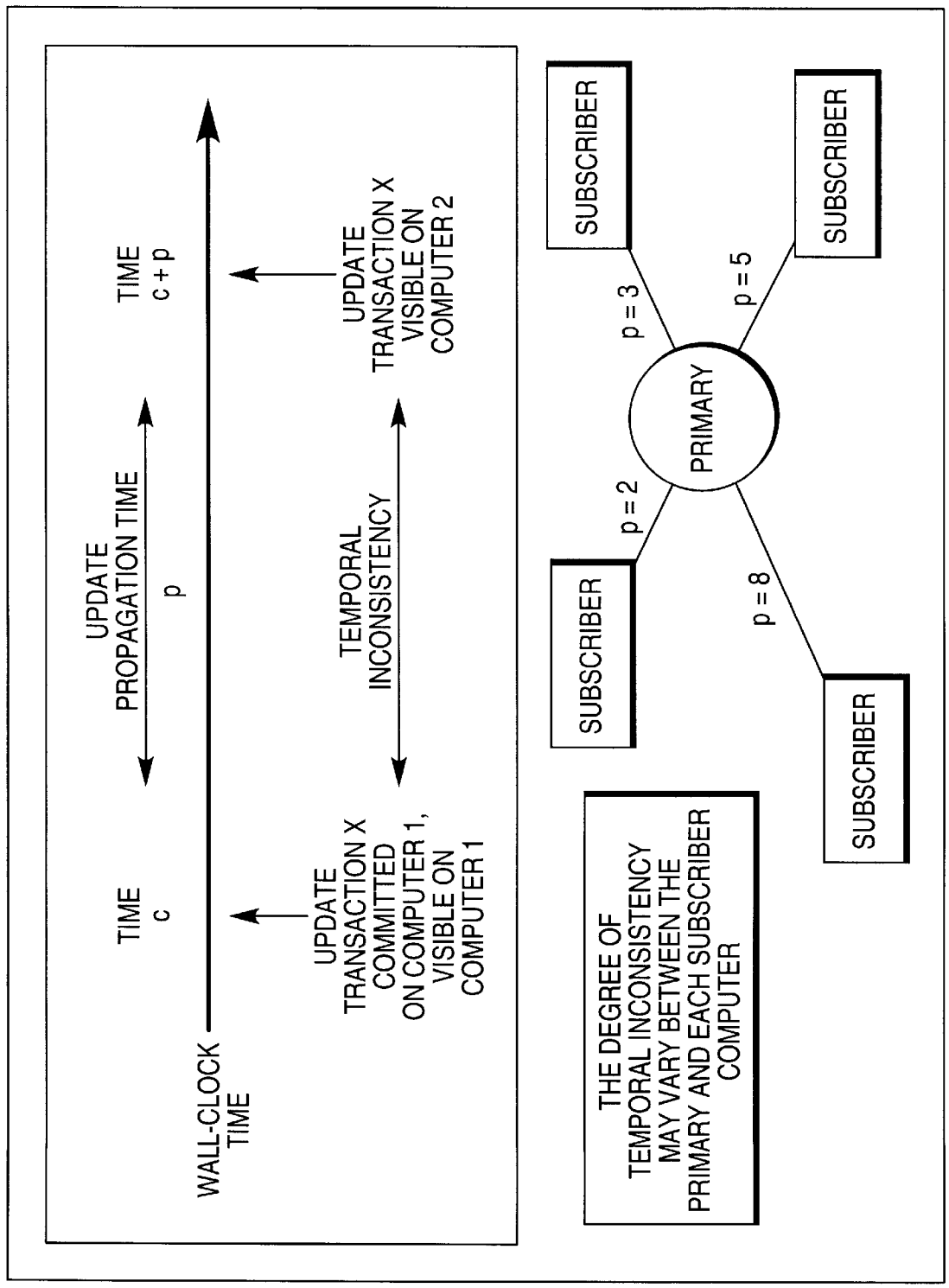
FIG. 6 illustrates temporal consistency of the database that is propagated by the present invention

FIG. 6 illustrates temporal consistency of the database that is propagated by the present invention. Within either replication model 500 or 502, the database 204 will have temporal inconsistencies because time is required to update the database 204 on each of the network 102 computing systems within a redundancy group 104. Update propagation in replicated database 204 processing has a side effect in that a trade-off must be made between update efficiency and the temporal consistency of the database 204 copies in the redundancy group 104. It is possible to synchronize the database 204 copies by propagating updates before the completion of an update transaction, e.g., before releasing database 204 locks and allowing commit processing to complete. However, absolute synchronization requires propagation protocols that are complex and expensive from a computing perspective.

The present invention allows the database 204 copies to deviate from each other in a temporal sense, and restrict consistency constraints to serializability and transaction-level atomicity. The approach of the present invention prevents any copy of the database 204 from having "dirty data," "partial updates," or out-of-order updates, but the timing of the appearance of the updates from a given transaction in any particular database 204 copy will be delayed to an unpredictable degree. The temporal deviation between the database 204 copies will be dependent on numerous factors including hardware utilization, instantaneous transaction mix, and network 102 latency.

The effects of inter-copy temporal inconsistency can be mitigated with numerous application processing techniques, including restriction of updates to selected time windows (during which queries may be restricted), clever partitioning of the query processing workload, and clever partitioning and/or clustering of user queries to specific database copies.

For a single replicated database schema, shown in replication model 502, each actively redundant configuration will support only one replicated database schema because of transaction-level consistency constraints.

Example Replication Scenario

Figure 7A:
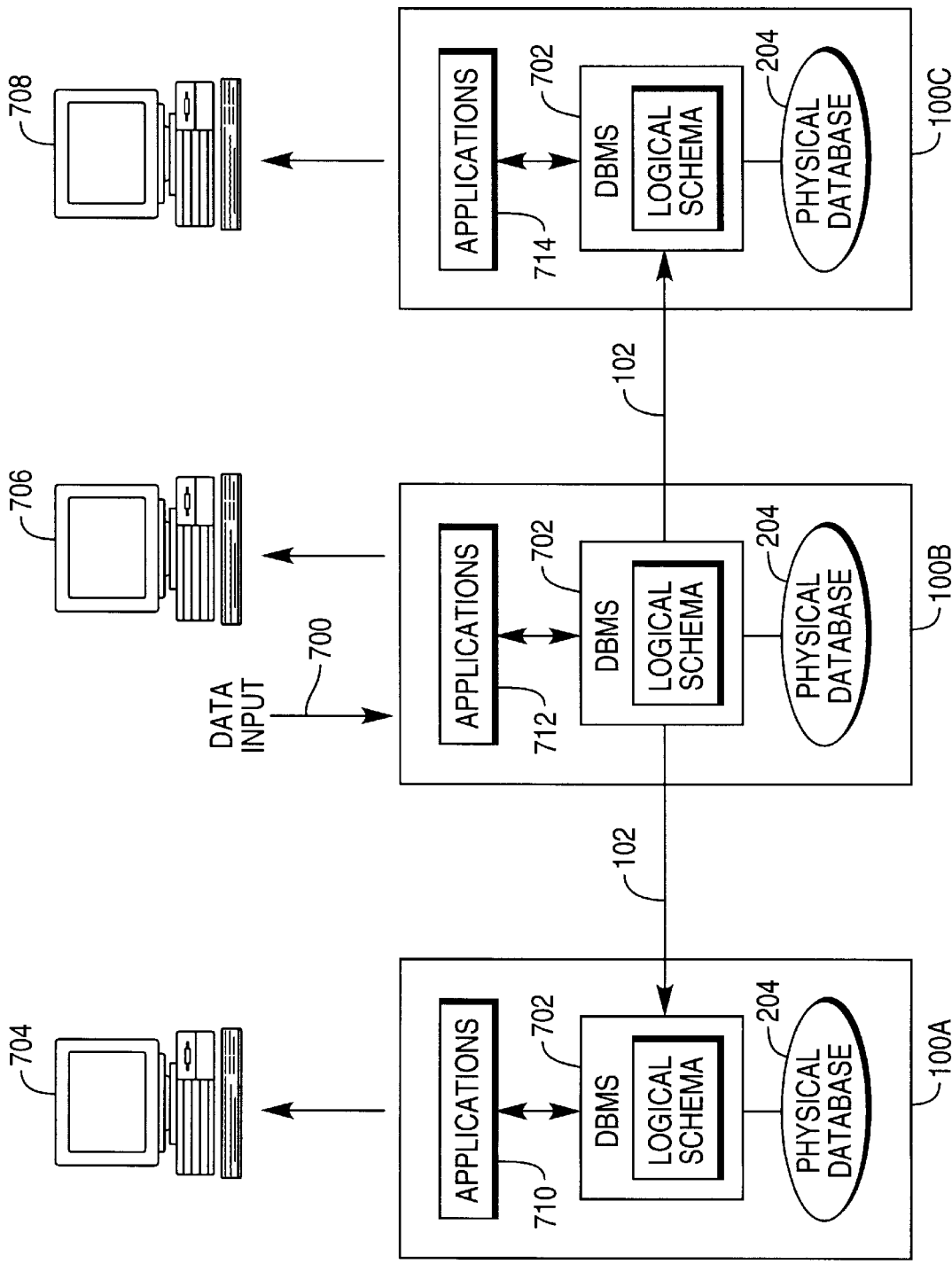
FIGS. 7A–7D illustrate the database replication scheme of the present invention.

FIGS. 7A–7D illustrate the database replication scheme of the present invention. FIG. 7A illustrates network 102 with computing systems 100A–100C. Within computing systems 100A–100C, database 204 is resident, typically on a data storage device.

As shown in FIG. 7A, data input 700 is received only by computing system 100B. Any of the computing systems 100A–C could be the recipient, but for illustration purposes, computing system 100B is used. Computing system 100B, using DBMS 702, then distributes the data input 700 to computing systems 100A and 100C via network 102.

This distribution of data input 102 synchronizes the databases 204 that are shared by the network 102. As shown, any of the computing systems 100A–100C can read the data input 700 at terminals 704–708, and use applications 710–714 to process the data stored in database 204.

Figure 7B:
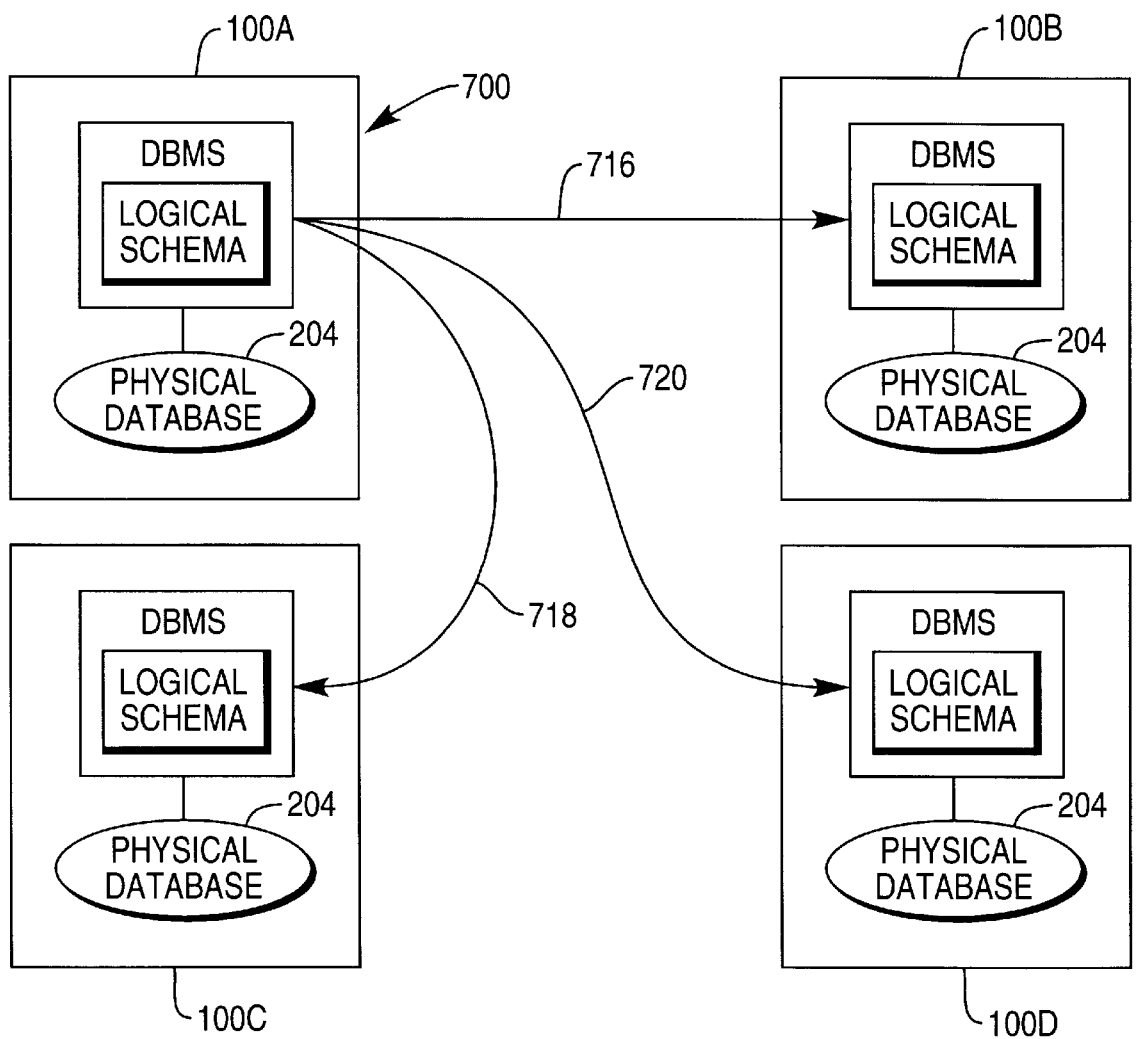
Figure 7C:
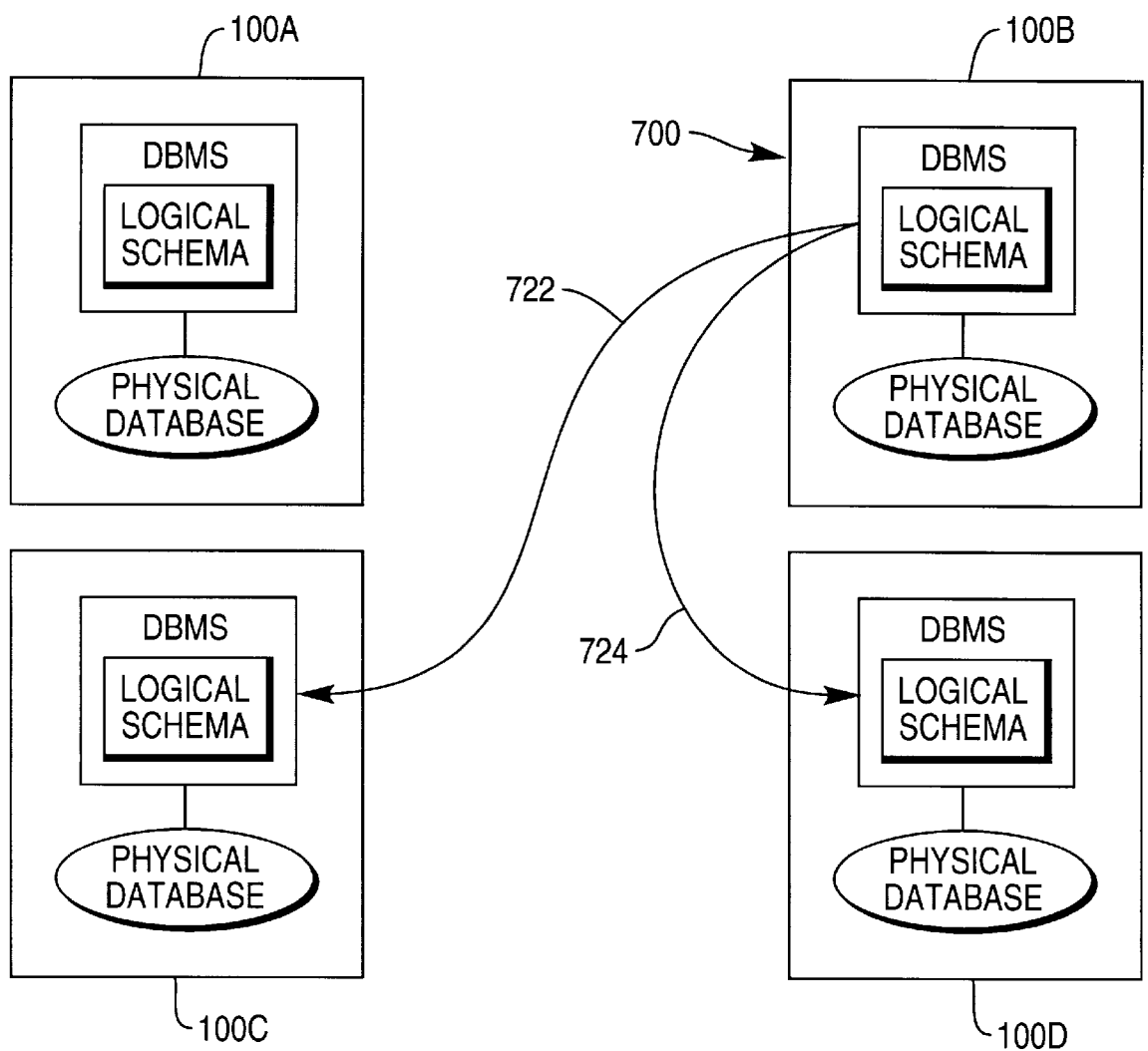
Figure 7D:
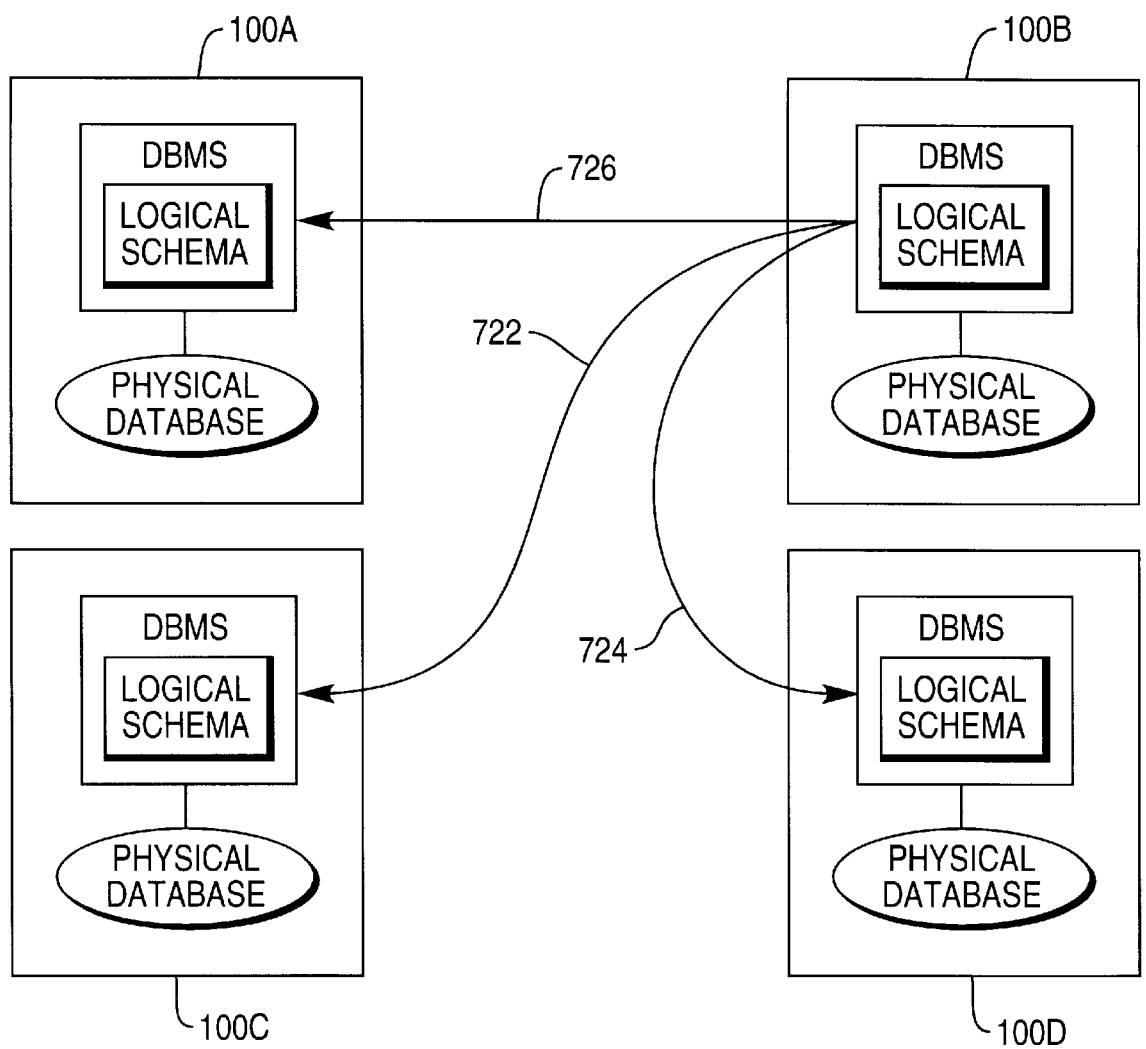

FIGS. 7B–7D illustrate how the present invention redistributes tasks within the network. FIG. 7B illustrates computing systems 100A–100D. For illustration purposes, computing system 100A is the computing system that is assigned the task of replicating database 204 to the remainder of the computing systems 100B–100D. The task that is assigned to computing system 100A could be a different task, and the computing systems 100B–D that computing system 100A must interact with to complete the task could also be different without deviating from the scope of the invention.

Computing system 100A replicates the database 204, using the data input 700, to computing system 100B via network path 716. Once that task is complete, computing system 100A replicates the database 204, using the data input 700, to computing system 100C via network path 718. Once that task is complete, computing system 100A replicates the database 204, using the data input 700, to computing system 100D via network path 720. When computing system 100A receives additional data input 700, the process repeats to replicate the changes to database 204 to all the computing systems 100B–100D.

FIG. 7C illustrates the network when computing system 100A is unavailable. The present invention employs utilities that monitor the status of computing systems 100A–100D that are connected to the network 102. The computing systems 100A–100D are grouped such that the computing systems 100A–100D, when one fails or is unavailable for some other reason, that one of the other computing systems within the group (called a "redundancy group") can take over the tasks that the failed computing system was performing. As an example, when computing system 100A fails or is otherwise unavailable, the present invention reroutes the data input 700 to another computing system in the redundancy group, which, in this case, is computing system 102B. Computing system 102B is assigned the task of replicating database 204, along with the updates to database 204 received via data input 700, to the remaining computing systems 100 in the redundancy group. Computing system 100B replicates the database 204, using the data input 700, to computing system 100C via network path 722. Once that task is complete, computing system 100B replicates the database 204, using the data input 700, to computing system 100D via network path 724.

FIG. 7D illustrates the network when computing system 100A becomes available again. Once computing system 100A is repaired or is otherwise reconnected to the redundancy group, or, in another example, when a new computing system 100 is added to the redundancy group, computing system 100B continues to perform the task that was assigned to computing system 100B, in this case, the replication of database 204. Computing system 100B, when it performs the replication task, will also replicate the database 204, using the data input 700, to computing system 100A via network path 726.

Logic of the Database Replicator

Figure 8:
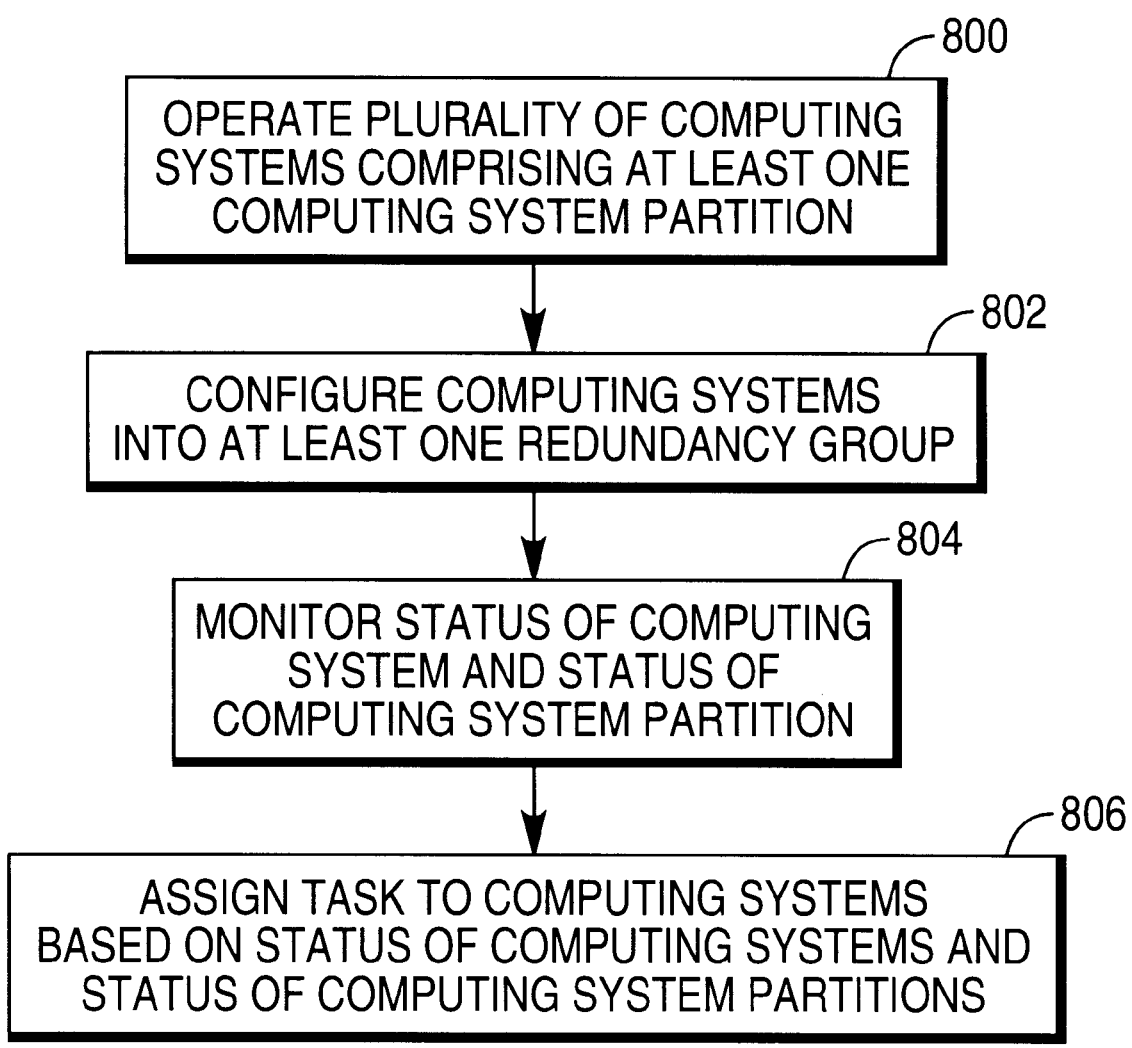
FIG. 8 is a flowchart that illustrates exemplary logic performed by the controller according to the present invention.

FIG. 8 is a flowchart that illustrates exemplary logic performed by the present invention.

Block 800 represents operating a plurality of computing systems 100A–D within a network, the computing system 100A–D comprising at least one computing system partition including at least one instance of an application, at least one computing system node, and at least one copy of a database schema, the copies of the database schema being replicated at each computing system partition within a network.

Block 802 represents the computing system 100 configuring the computing systems into at least one redundancy group.

Block 804 represents the computing system 100 monitoring a status of the computing system and a status of the computing system partition within the redundancy group.

Block 806 represents the computing system 100 assigning a task to the computing systems based on the status of the computing systems and the status of the computing system partition within the redundancy group.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program utilizing (either partially or entirely) a database could benefit from the present invention.

An apparatus in accordance with the present invention comprises at least one redundancy group comprised of one or more computing systems, which are comprised of one or more computing system partitions. The computing system partition includes copies of a database schema that are replicated at each computing system partition. The redundancy group monitors the status of the computing systems and the computing system partitions, and assigns a task to the computing systems based on the monitored status of the computing systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A data storage system comprising:

one or more computing systems connected through a network and organized into computing system partitions, where each computing system partition includes a physical copy of a database schema, and where each database schema is replicated on at least two of the computing system partitions organized logically as a redundancy group; and a redundancy management component implemented in at least one of the computing systems and configured to monitor whether the computing system partitions in a redundancy group are functioning properly and, when one of the computing system partitions is not functioning properly, to reassign a task performed by that computing system partition to another computing system partition in the redundancy group.

2. The system of claim 1, where the reassigned task includes replication of the database across the computing system partitions.

3. The system of claim 1, where the reassigned task includes execution of application programs for use in manipulating data in the database.

4. The system of claim 1, where the redundancy management component is configured not to reassign the task back to the malfunctioning computing system partition when that computing system partition resumes normal operation.

5. The system of claim 1, where at least two of the computing system partitions in the redundancy group reside in two distinct computing systems.

6. The system of claim 1, where at least two of the computing system partitions in the redundancy group reside in a single computing system.

7. The system of claim 1, where at least one of the computing system partitions is included in two distinct redundancy groups.

8. The system of claim 1, where the redundancy management component is configured to add computing system partitions to or remove computing system partitions from the redundancy group.

9. A method for use in storing data in a computer network, comprising:

organizing one or more computing systems into computing system partitions, each including a physical copy of a database schema;

replicating each database schema on at least two of the computing system partitions and organizing these computing system partitions logically as a redundancy group;

configuring at least one of the computer systems to operate as a redundancy manager that monitors whether the computing system partitions in a redundancy group are functioning properly; and when one of the computing system partitions is not functioning properly, configuring the redundancy manager to reassign a task performed by that computing system partition to another computing system partition in the redundancy group.

10. The method of claim 9, where reassigning the task includes reassigning the task of replicating the database across the computing system partitions.

11. The method of claim 9, where reassigning the task includes reassigning the task of executing application programs for use in manipulating data in the database.

12. The method of claim 9, further comprising configuring the redundancy manager not to reassign the task back to the malfunctioning computing system partition when that computing system partition resumes normal operation.

13. The method of claim 9, where organizing the computing systems into computing system partitions includes assigning two of the computing system partitions in the redundancy group to two distinct computing systems.

14. The method of claim 9, where organizing the computing systems into computing system partitions includes assigning at least two of the computing system partitions in the redundancy group to a single computing system.

15. The method of claim 9, where organizing the computing systems into computing system partitions includes assigning at least one of the computing system partitions to two distinct redundancy groups.

16. The method of claim 9, further comprising configuring the redundancy manager to add computing system partitions to or remove computing system partitions from the redundancy group.

* * * * *